US007356915B2

(12) United States Patent
Murg

(10) Patent No.: US 7,356,915 B2
(45) Date of Patent: *Apr. 15, 2008

(54) STRIPPER TOOL FOR SHEATHED CABLE

(75) Inventor: Leonard R. Murg, Eastlake, OH (US)

(73) Assignee: Stride Tool Inc., Ellicottville, NY (US)

( * ) Notice: Subject to any disclaimer, the term of this patent is extended or adjusted under 35 U.S.C. 154(b) by 250 days.

This patent is subject to a terminal disclaimer.

(21) Appl. No.: 10/775,832

(22) Filed: Feb. 10, 2004

(65) Prior Publication Data

US 2005/0005738 A1    Jan. 13, 2005

Related U.S. Application Data

(63) Continuation of application No. 09/185,493, filed on Nov. 3, 1998, now Pat. No. 6,691,403.

(51) Int. Cl.
*B23P 19/00* (2006.01)
(52) U.S. Cl. .................. 29/764; 29/564.4; 29/566; 29/566.4; 29/867; 30/90.1; 81/9.44
(58) Field of Classification Search ............. 29/564.4, 29/764, 566, 566.4, 867; 30/90.1, 90.2; 81/9.44
See application file for complete search history.

(56) References Cited

U.S. PATENT DOCUMENTS

| 5,669,132 A | * | 9/1997 | Brimmer | 29/426.4 |
| 5,732,471 A | * | 3/1998 | Korinek et al. | 30/90.6 |
| 6,691,403 B1 | * | 2/2004 | Murg | 29/825 |

* cited by examiner

*Primary Examiner*—Rick K Chang
(74) *Attorney, Agent, or Firm*—Benesch, Friedlander, Coplan & Aronoff LLP

(57) ABSTRACT

A stripper tool is provided for cutting an outer sheath of an electrical cable. Inside the sheath is parallel spaced apart insulation covered wires and a core member containing an uncovered ground wire between the insulation covered wires. The sheath has spaced apart curved sides conforming to the covered wires. The tool has spaced apart first and second jaw members adapted to be pressed together. The jaw members have cutting edges that receive a portion of the cable along its length. The cutting edges define an opening configured to cut the sheath and the core without significantly cutting the insulation on the wires or the unsheathed ground wire when the jaw members are pressed together to form the opening. The portion of the sheath is then removed in one continuous process.

7 Claims, 4 Drawing Sheets

STRIPPER TOOL FOR SHEATHED CABLE

CROSS-REFERENCE TO RELATED APPLICATION

This is a continuation of U.S. application Ser. No. 09/185,493 filed on Nov. 3, 1998, which is now U.S. Pat. No. 6,691,403.

BACKGROUND OF THE INVENTION

Brimmer in U.S. Pat. No. 5,669,132 discloses a stripper tool to remove the outer sheath of an electrical cable having a pair of spaced apart covered electrical wires and an uncovered ground wire therebetween located inside the sheath (hereinafter referred to as "X/2 cable"). That stripper tool, however, is specifically designed to not cut the outer edges of the outer sheath. The user, according to Brimmer, cuts the outer sheath except the outer edge, and then must remove the tool from the cable. The user grasps the sheath, to be removed, and bends the uncut outer portion at least twice to break it. The user then pulls with his fingers the "broken" outer sheath from the cable to expose the electrical and ground wires. The Brimmer tool provides an uncut portion on the sheath because Brimmer maintains the cable elongates itself when the tool cuts the outer sheath. Thus, to avoid cutting the electrical wires Brimmer designed his tool to not cut the cable's outer edge, and inherently the electrical wire.

None of the prior art patents describe a hand-held stripper tool to cut the entire outer sheath of X/2 cable without cutting the electrical or ground wires. None of the prior art patents disclose a hand-held stripper tool wherein the user applies a force to the tool to cut the outer sheath of X/2 cable and then pushes on the tool to remove the cut outer sheath.

DETAILED DESCRIPTION OF THE PRESENT INVENTION

Figure 1:
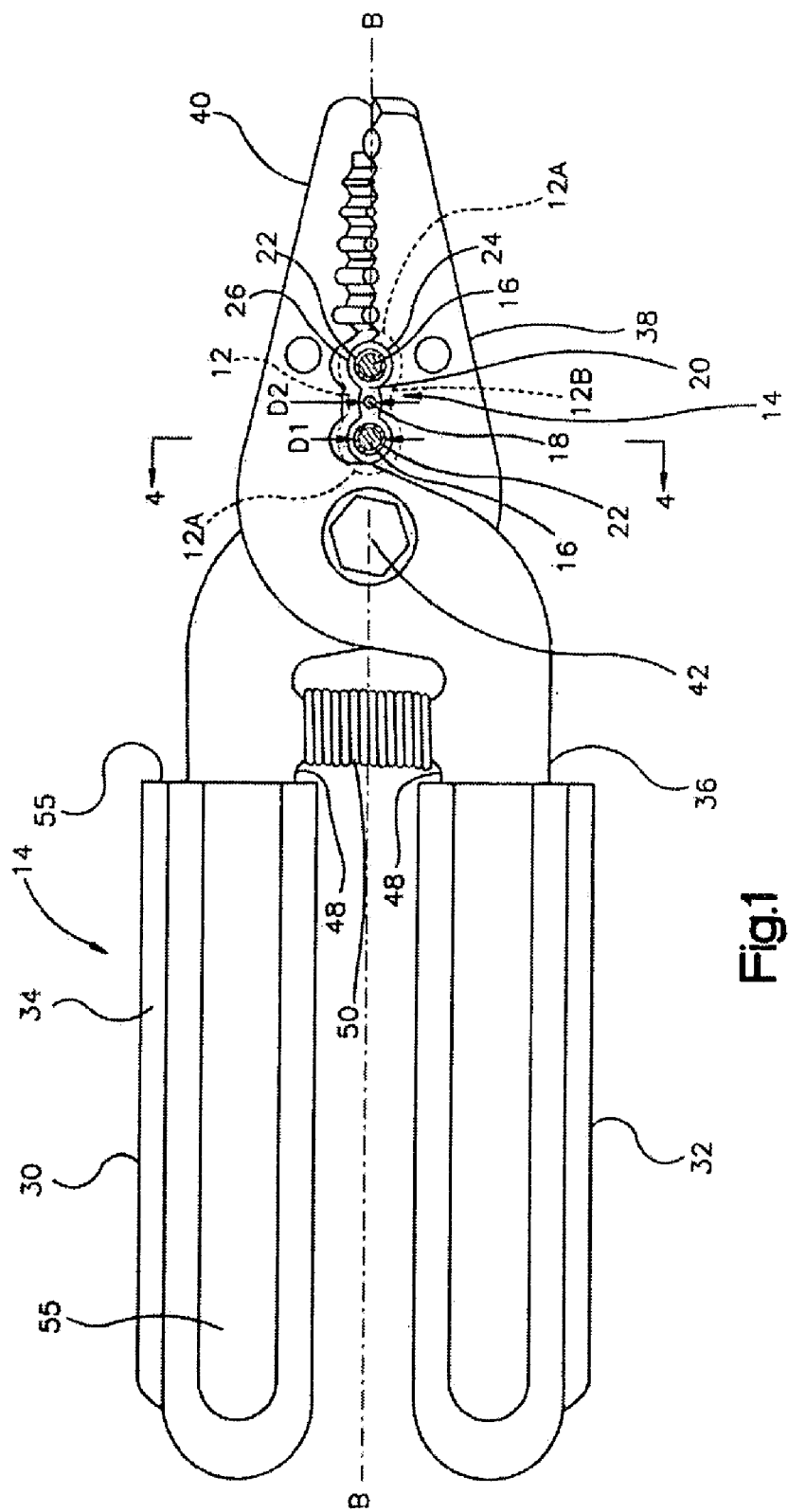
FIG. 1 is a partial view of the first and second jaws specifically showing the cable positioned within the complete cutting opening.

FIG. 1 shows a preferred embodiment of a stripper tool 10. The stripper tool 10 is adapted to cut and remove an outer sheath 12 from a non-metallic sheathed cable 14 in one continuous process. The term "one continuous process" means the user does not release the force applied to the tool 10 until the cut outer sheath 12 is removed from the cable 14. The cable 14 as shown in FIG. 1, has a non-metallic outer sheath 12 that encloses a pair of spaced apart electrical wires 16 and an uncovered ground wire 18 positioned between the electrical wires 16. Packing 20 is also located within the sheath 12 between the wires 16 and 18 and acts to keep the wires 16 and 18 spaced apart.

Each electrical wire 16 has an outer covering 22 to insulate the wires 16 and prevent electrical shorts and accidental electrical shock. Each wire 16 forms an opposed side 12A of the non-metallic sheath 12. Preferably, the electrical wires 16 have a circular cross-section and are pressed against the opposed sides 12A. As such, each opposed side 12A forms an arcuate shape.

In a preferred embodiment, the outer diameter D1 of the outer covering 22 is larger than the outer diameter D2 of the uncovered ground wire 18. Thus, the non-metallic sheath 12 preferably has an essentially rectangular cross-section having a flat middle portion 12B and opposed arcuate sides 12A (FIG. 1). The positioning of the smaller outer diameter ground wire 18 between the larger diameter covered electrical wires 16 allows the flat middle portion 12B to be essentially flat and straight across. The larger diameter of the outer covering 22 elevates the outer sheath 12 wherein the conventional position for the outer sheath 12 is spaced above and below the ground wire 18. However, during cutting, the flat middle portion 12B is pressed inward to contact the ground wire 18 (FIG. 1).

The outer sheath 12 is preferably constructed of a pliable plastic such as PVC that is easily cut by a sharp blade. The outer sheath 12 is preferably 30 mills thick, thereby the knife blades 24C and 26C (to be discussed in detail hereinafter) can easily cut through the outer sheath 12 without damaging the wires 16 and 18. Preferably, the cable 14 is of the type commonly known as ROMEX™ sold by ELECTRICAL SUPPLIES.

Figure 2:
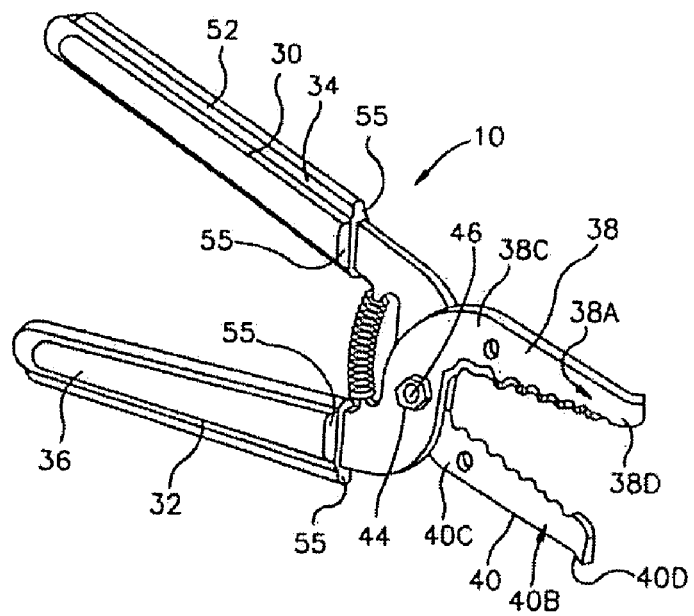
FIG. 2 is a perspective view of the stripper tool of the present invention.

As shown in FIG. 2, the stripper tool 10 has a first member 30 and a second member 32 that attach to each other to form a pair of pliers. The first member 30 and second member 32 provide a first handle 34 and a second handle 36 and a first jaw 38 and a second jaw 40. Preferably, the first member 30 and the second member 32 are identical to enable the members to be interchangeable.

Figure 3:
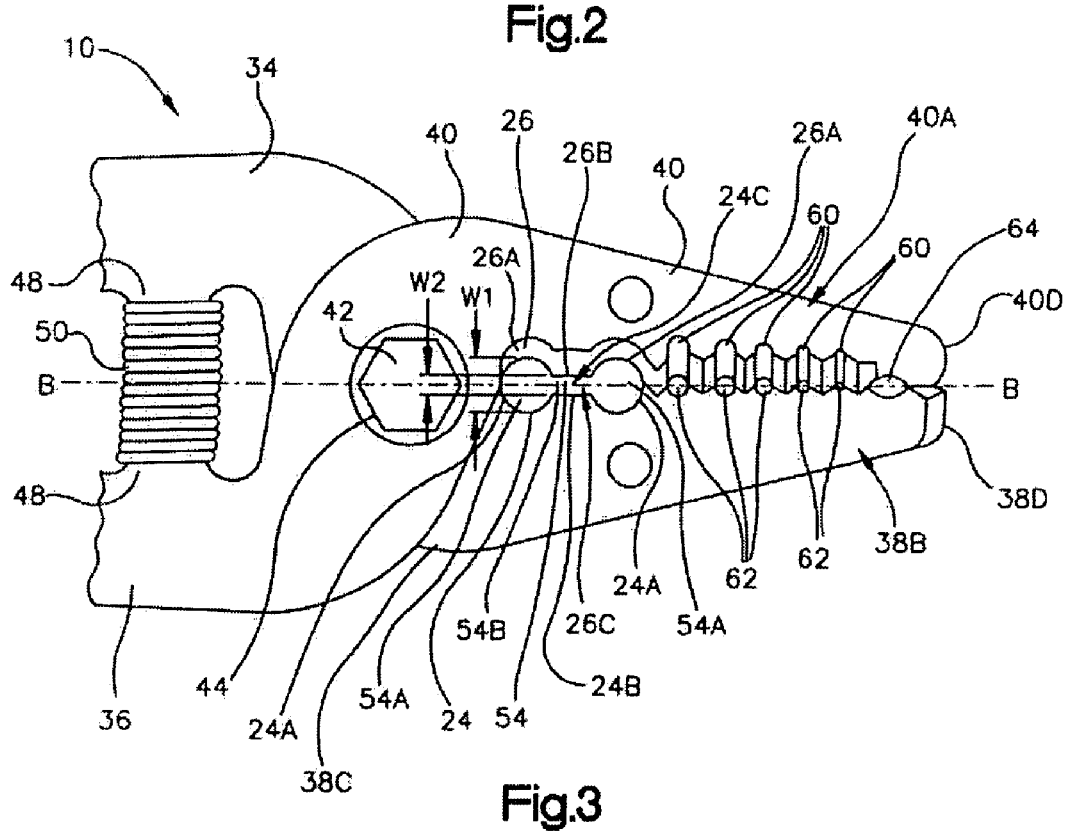
FIG. 3 is a side view of the first and second jaws of the tool showing the cutting edges and the complete cutting opening.

The members 30 and 32 are joined together at a pivot point 42 by a pivot nut 44 and a pivot bolt 46. The pivotal connection enables the members 30 and 32 to pivot about pivot axis A-A of the tool 10 with respect to each other. The handles 34 and 36 and the jaws 38 and 40 extend outward from the pivot point 42 perpendicular to the pivot axis A-A and parallel to the longitudinal axis B-B of the tool 10 (FIG. 3). The members 30 and 32 are connected in the conventional plier arrangement such that the second handle 36 is spaced above and parallel to the first handle 34 when the first jaw 38 is spaced above and parallel to the second jaw 40 (FIG. 2). It is understood however, that flipping the tool 10 over, reverses the respective positions of the handles 34 and 36 and the jaws 38 and 40. Thus, when the handles 34 and 36 are moved together, the jaws 38 and 40 move together in a corresponding fashion.

The handles 34 and 36 also have nubs 48 adjacent to the pivot point 42 that extend upward perpendicular to the axis B-B. A single coil spring 50 is mounted between the nubs 48 and acts to bias the handles 34 and 36. The jaws 38 and 40, inherently, become spaced apart once the closing pressure on the handles 34 and 36 has been released. In addition, upon complete closing of the handles 34 and 36, the nubs 48 prevent the handles 34 and 36 from being pressed beyond the closed position. The nubs, thus, prevent the first and second members 30 and 32 from bending.

As shown in FIG. 2, the handles 34 and 36 are preferably encased in an insulated, ergonomic outer coating 52. That coating 52 enables the user (not shown) to better grip the tool 10 and protects the user against electrical shock in case the jaws 38 and 40 accidentally cut into a "hot" electrical wire (not shown). The ergonomic attributes are attained by the air gaps 55.

The jaws 38 and 40 have proximal ends 38C and 40C and distal ends 38D and 40D with an outside surface 38A and 40A and an inside surface 38B and 40B, therebetween. The members 30 and 32 are connected together such that the inside surface 38B is adjacent the inside surface 40B As shown in FIG. 3, in the closed position, the jaws 38 and 40 are preferably angled inward toward the axis B-B so the proximal ends 38C and 40C, adjacent the pivot point 42, are larger than the opposed distal ends 38D and 40D. The angled shape of the jaws 38 and 40 enables the tool 10 to be used in tighter spaces.

The first and second cutting edge 24 and 26 are located in the proximal ends 38C and 40C adjacent the pivot point 42. The cutting edges 24 and 26 have two opposed arcuate ends 24A and 26A with a raised, preferably slightly arcuate alternatively or elongated, middle portion 24B and 26B therebetween. The cutting edges 24 and 26 have an elongated shape extending along the jaws 38 and 40 parallel to the axis B-B. When the jaws 38 and 40 are moved together into the closed position, a complete cutting opening 58 is formed by the first and second cutting edges 24 and 26 (FIG. 3).

The cutting edges 24 and 26 are tapered inward from the outside surface 38A and 40A toward the inside surface 38B and 40B. The knife blade 24C and 26C is formed on the cutting edges 24 and 26 at the inside surfaces 38B and 40B. The cutting edges 24 and 26 are tapered inward resulting in the knife blade 24C being adjacent and parallel to the knife blade 26C. The knife blades 24C and 26C are sharp enough to easily cut the outer sheath 52. When the jaws 38 and 40 are closed, the two arcuate ends 24A and 26A form opposed arcuate ends 54A and the raised middle portion 24B and 26B form a narrower center portion 54B. The complete cutting opening 54 (54A and 54B) is shaped such that the center portion 54B has a width less than that of the opposed arcuate ends 54A. Preferably, the width W2 of the center portion 54B is only slightly smaller than the outer diameter D2 of the sheath 52 over the ground wire 18. Similarly, the width W1 of the opposed arcuate ends 54A is preferably slightly smaller than the outer diameter D1 of the outer covering 22.

Figure 4:
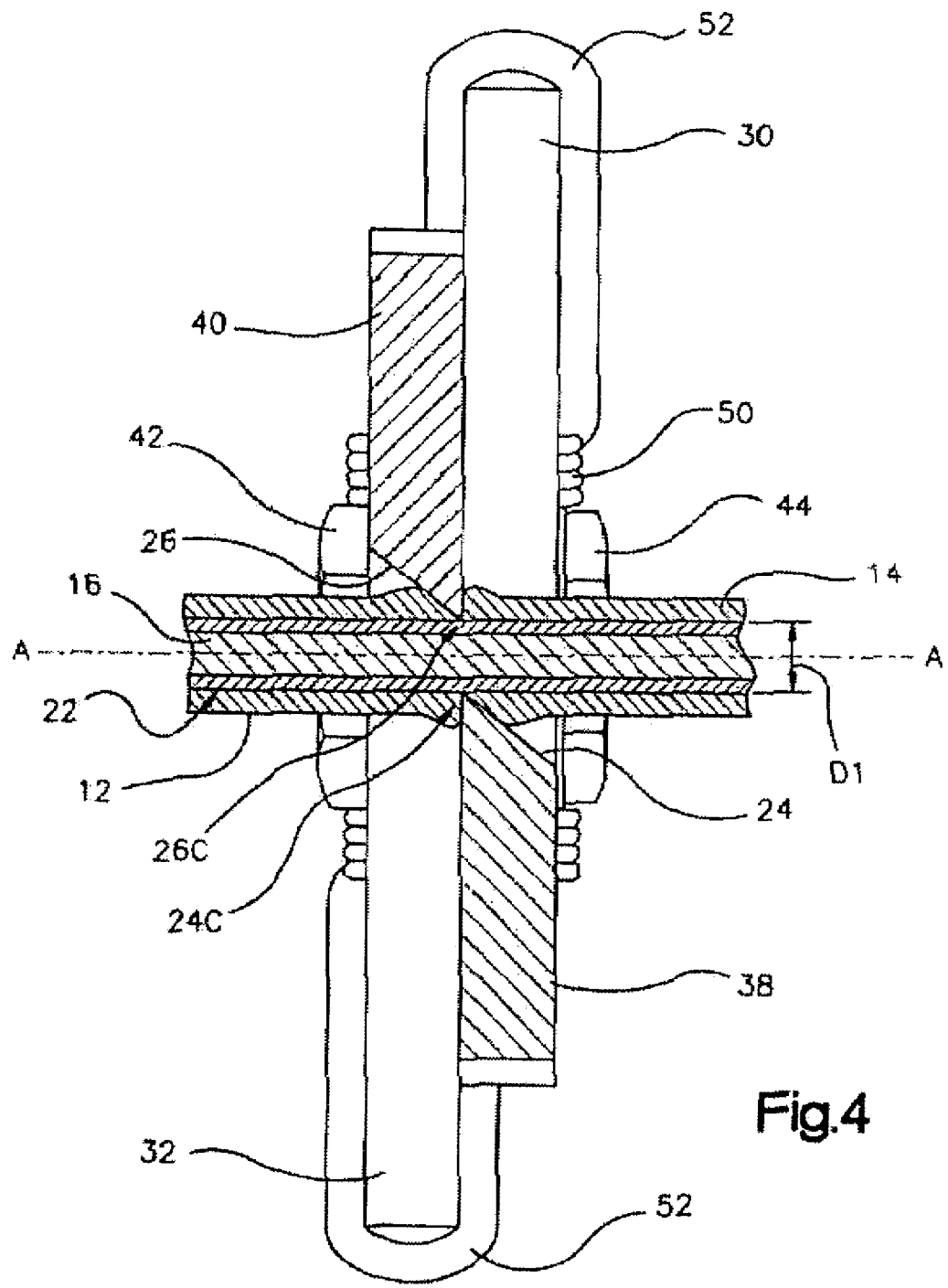
FIG. 4 is a cross-sectional view of FIG. 1 along the line 4-4 showing the knife blades of the cutting edges extending through the outer sheath.

As shown in FIG. 1, the length of the cutting opening 54 is less than the width of the cable 14 between the opposed sides 12A. Thus, when the jaws 38 and 40 are completely closed, the opening 54 cuts the sheath 12. The shape and width of the opposed ends 54A and center portion 54B are such that when the jaws 38 and 40 are completely closed, the knife blades 24C and 26C sever the outer sheath 12 (FIG. 1). In addition, the widths W1 and W2 in the completely closed position allow the knife blades 24C and 26C to not contact any of the three inner wires 16 and 18 or their respective coverings 22. Thus, the cutting blades 24C and 26C are designed, under proper use, to not extend into the outer covering 22 or into the uncovered ground wire 18 (FIG. 4). Cutting into the outer covering 22 may cause an electrical short in the wires 16 that could lead to an electrical fire or cause electrical failure. Although, there is less cause for alarm if the ground wire 18 is nicked, completely severing the ground wire 18 could cause problems. Preferably, the cutting opening 54 accommodates at least one of the common sized ROMEX™ cable, i.e., 14/2, 12/2 or 10/2.

The jaws 38 and 40 are preferably constructed from metal with the cutting edges 24 and 26 and the knife blades 24C and 26C formed directly into the jaws 38 and 40 by a machining process.

In another preferred embodiment, the jaws 38 and 40 are provided with a plurality of recesses 60 in the distal ends 38D and 40D and spaced apart from the complete cutting opening 54. The recesses 60 are positioned to form a plurality of openings 62 when the first and second jaws 38 and 40 are moved together (FIG. 3). Preferably, the plurality of openings 62 are similar to conventional wire strippers that strip individually covered wires, conventional wire loop holes to twist wire 270°, and screw/bolt cutters. The plurality of recesses 60 allow a variety of sized wires to be stripped, twisted and bolts/screws to be cut.

The distal ends 38D and 40D are curved toward the inside surface 38B and 40B, respectively. The curving of the distal ends 38D and 40D forms a gap 64 between the jaws 38 and 40 (FIG. 3). The gap 64 along with the curved distal ends 38D and 40D enable the tool 10 to be used to twist wires (not shown). The edges of the gap 64 are dull in order to reduce the risk of damaging the wires during twisting. Moreover, the distal ends 38D and 40D also form a conventional plier nose configuration.

Figure 5:
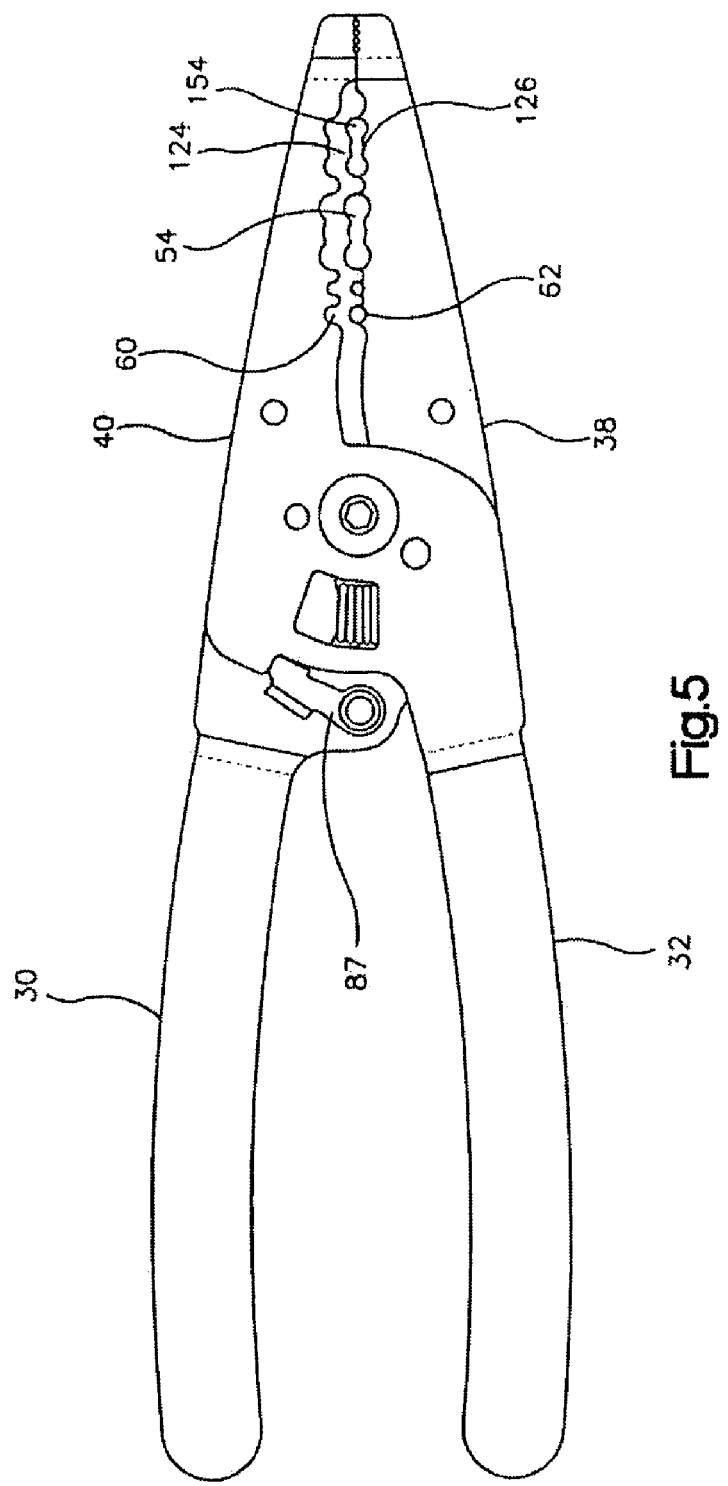
FIG. 5 is an alternative embodiment of FIG. 2.

FIG. 5 shows an alternate embodiment of the tool 10. The alternate embodiment of tool 10 is that it has supplementary cutting edges 124 and 126. The supplementary cutting edges 124 and 126 like the preferred cutting edges 24 and 26, form a supplementary cutting opening 154 when the jaws 38 and 40 are pressed together. The supplementary cutting opening 154 is spaced apart from the first cutting opening 54 toward the distal ends 38D and 40D. Preferably, the supplementary cutting opening 154 is identical to the first complete cutting opening 54 in shape, but has a different length and width. The supplementary cutting opening 154 allows the tool 10 to be used to strip two different sizes of cable 14.

Moreover, the tool 10 has a locking mechanism 87 to secure the members 30, 32 in place when tool 10, is not to be used. The semi-circular recesses 60 can also be located on the other side of the opening 54.

IN USE

To use the tool 10, the cable 14 is positioned between the cutting edges 24 and 26 so the cable 14 is perpendicular to the axis B-B and the portion of the outer sheath 12 to be stripped extends outward from one side of the jaws 38 and 40. The handles 34 and 36 are then pressed together so the cutting edges 24 and 26 form the complete cutting opening 54 around the cable 14. As such, the opposed ends 54A are then adjacent the opposed sides 12A and the narrower center portion 54B is adjacent the flat middle portion 12B. The handles 34 and 36 are further pressed together until the knife blades 24C and 26C cut into the entire perimeter of the outer sheath 12. Preferably, the force needed to cut the sheath 12 with the stripper tool 10 is easily accomplished by an adult using one hand (not shown). In the completely closed position, the knife blades 24C and 26C only cut through the outer sheath 12 and do not cut into the outer covering 22 or into the uncovered ground wire 18. Once the outer sheath 12 is cut, the user pushes the tool 10 away from the cable 14 to remove the portion of the outer sheath 12. Once the outer sheath 12 is removed, the user can release the pressure on the handles 34 and 36 and then use the plurality of circular recesses 60 to remove the outer covering 22 that are exposed after the outer sheath 12 is removed.

Numerous variations will occur to those skilled in the art. It is intended therefore, that the foregoing descriptions be only illustrative of the present invention and that the present invention be limited only by the hereinafter appended claims.

What is claimed is:

1. A tool for cutting and stripping a sheath from an electrical cable, the electrical cable having a spaced pair of insulated power conducting wires, a ground wire disposed between the power conducting wires, and the sheath surrounding the power conducting and ground wires, the sheath having a pair of spaced side portions that contain the power conducting wires and a central portion disposed therebetween that contains the ground wire, the tool comprising:
   a) a pair of levers having jaw, boss and handle portions;
   b) a pivot joining the boss portions to enable relative movement of the levers about the pivot between open and closed positions;
   c) a spring positioned between the handle portions to bias the handle portions away from each other;
   d) the jaw portions each having blade sections, each blade section having a set of three aligned cutting parts of a cutting edge, the three cutting parts including a spaced pair of end cutting parts configured to at least partially cut through the side portions of the sheath, and a raised middle cutting part provided between the end cutting parts and configured to cut the central portion of the sheath; and
   e) the cutting parts on each blade section together forming a cable receiving opening when the levers are in the closed position, the cable receiving opening is sized such that, when the levers are moved from the open to the closed position, the perimeter of the sheath is cut.

2. The tool of claim 1, wherein the cable receiving opening is sized such that the perimeter of the sheath is completely cut through when the levers are moved from the open to the closed position.

3. A tool for cutting and stripping a sheath from an electrical cable, the electrical cable having a spaced pair of insulated power conducting wires, a ground wire disposed between the power conducting wires, and the sheath surrounding the power conducting and ground wires, the sheath having a pair of spaced side portions that contain the power conducting wires and a central portion disposed therebetween that contains the ground wire, the tool comprising:
   a) a pair of levers having jaw, boss and handle portions;
   b) a pivot joining the boss portions to enable relative movement of the levers about the pivot between open and closed positions;
   c) a spring positioned between the handle portions to bias the handle portions away from each other;
   d) the jaw portions each having blade sections for coactively circumferentially severing the sheath when the levers are moved from the open to the closed position;
   e) each blade section having a set of three aligned cutting parts of a cutting edge, the set of three cutting parts including a spaced pair of end cutting parts being contoured to cut the side portions of the sheath and a raised middle cutting part between the end cutting parts for cutting the central portion of the sheath; and
   f) the cutting parts together forming a cable wire receiving opening when the levers are in the closed position, the cable receiving opening being of a configuration smaller than the configuration of the sheath, such that the sheath is circumferentially severed when the levers are moved from the open to the closed position.

4. The tool of claim 3, wherein the cable receiving opening is sized such that the perimeter of the sheath is completely cut through when the levers are moved from the open to the closed position.

5. The tool of claim 1, wherein the raised middle cutting part is arcuate with end portions curving toward a longitudinal axis of the tool.

6. The tool of claim 1, wherein the jaw portions of the levers are in parallel planes.

7. The tool of claim 3, wherein the jaw portions of the levers are in parallel planes.

* * * * *